(12) United States Patent
Nolet et al.

(10) Patent No.: US 12,145,345 B2
(45) Date of Patent: Nov. 19, 2024

(54) COMPOSITE RODS FOR STABILIZATION OF COMPOSITE LAMINATES

(71) Applicant: TPI Composites, Inc., Warren, RI (US)

(72) Inventors: Stephen Nolet, Harpswell, ME (US); James Hannan, Fairhaven, MA (US)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 18/313,075

(22) Filed: May 5, 2023

(65) Prior Publication Data

US 2023/0271398 A1 Aug. 31, 2023

Related U.S. Application Data

(63) Continuation of application No. 16/793,943, filed on Feb. 18, 2020, now Pat. No. 11,679,576.

(Continued)

(51) Int. Cl.
*B32B 3/10* (2006.01)
*B32B 3/08* (2006.01)
(Continued)

(52) U.S. Cl.
CPC ............... *B32B 3/10* (2013.01); *B32B 3/085* (2013.01); *B32B 5/26* (2013.01); *D04B 1/22* (2013.01);
(Continued)

(58) Field of Classification Search
CPC .. B32B 3/10; B32B 3/085; B32B 5/26; B32B 2260/021; B32B 2260/046; D04B 1/22;
(Continued)

(56) References Cited

U.S. PATENT DOCUMENTS

| 4,902,215 A | 2/1990 | Seemann, III |
| 5,188,872 A | 2/1993 | Quigley |

(Continued)

FOREIGN PATENT DOCUMENTS

| CN | 1758995 A | 4/2006 |
| JP | 2007/269034 A | 10/2007 |

OTHER PUBLICATIONS

International Preliminary Report on Patentability for International Application No. PCT/US2020/018657 dated Aug. 10, 2021.

(Continued)

*Primary Examiner* — Catherine A. Simone
(74) *Attorney, Agent, or Firm* — Stephen J. Kenny; Foley Hoag LLP

(57) ABSTRACT

Structurally enhanced preformed layers of multiple rigid unidirectional rods are constructed and arranged for use in fabricating load-bearing support structures and reinforcements in a variety of composite components, e.g. wind turbine blades. Individual preform layers include multiple elongate unidirectional strength elements or rods arranged in a single layer along a longitudinal axis of the preform layer. Individual rods include aligned unidirectional structural fibers embedded within a matrix resin such that the rods have a substantially uniform distribution of fibers and high degree of fiber collimation. The relative straightness of the fibers and fiber collimation provide rods and the preform layers with high rigidity and significant compression strength. A plurality of rods are loosely attached, e.g. knitted, together with a coupling that allows for each rod to be axially displaced, e.g. slideable, relative to another rod.

18 Claims, 4 Drawing Sheets

Related U.S. Application Data

(60) Provisional application No. 62/806,169, filed on Feb. 15, 2019.

(51) Int. Cl.
*B32B 5/26* (2006.01)
*D04B 1/22* (2006.01)
*D04B 21/20* (2006.01)
*B29C 70/48* (2006.01)
*B29K 63/00* (2006.01)
*B29K 105/08* (2006.01)
*B29L 31/08* (2006.01)

(52) U.S. Cl.
CPC .............. *D04B 21/20* (2013.01); *B29C 70/48* (2013.01); *B29K 2063/00* (2013.01); *B29K 2105/0881* (2013.01); *B29L 2031/085* (2013.01); *B32B 2260/021* (2013.01); *B32B 2260/046* (2013.01)

(58) Field of Classification Search
CPC .... D04B 21/20; B29C 70/48; B29K 2063/00; B29K 2105/0881; B29L 2031/085
See application file for complete search history.

(56) References Cited

U.S. PATENT DOCUMENTS

| | | |
|---|---|---|
| 8,109,734 B2 | 2/2012 | Backhouse |
| 9,145,627 B2 | 9/2015 | Wilson et al. |
| 10,022,907 B2 | 7/2018 | Bergstrom et al. |
| 11,679,576 B2* | 6/2023 | Nolet ................ B32B 5/026 428/114 |
| 2007/0140861 A1 | 6/2007 | Wobben |
| 2012/0156422 A1 | 6/2012 | Kozar et al. |
| 2017/0072656 A1 | 3/2017 | Dodworth |
| 2018/0036914 A1 | 2/2018 | Marsal et al. |
| 2018/0274517 A1 | 9/2018 | Gruhn et al. |
| 2020/0262171 A1 | 8/2020 | Nolet et al. |

OTHER PUBLICATIONS

International Search Report and Written Opinion for International Application No. PCT/US2020/018657 mailed Jun. 10, 2020.

* cited by examiner

COMPOSITE RODS FOR STABILIZATION OF COMPOSITE LAMINATES

CROSS REFERENCE TO RELATED APPLICATIONS

This application is a Continuation of and claims the benefit of priority under 35 USC 120 to U.S. patent application Ser. No. 16/793,943, filed on Feb. 18, 2020, which claims the benefit under 35 USC 119 of U.S. Provisional App. No. 62/806,169, filed Feb. 15, 2019, which is hereby incorporated by reference in its entirety.

BACKGROUND OF THE DISCLOSED SUBJECT MATTER

Field of the Disclosed Subject Matter

The disclosed subject matter relates to a system and method for manufacturing reinforced composite structures. Particularly, the present disclosed subject matter is directed towards structural preform layers of multiple rigid strength elements or rods for use in fabricating composite structures such as vehicles (land or marine), building/construction materials, and wind blade components.

DESCRIPTION OF RELATED ART

A variety of methods and systems for Vacuum-assisted resin transfer molding (VARTM) are known for forming composite products, including large, thick composite laminates such as those used in the manufacturing of critical structural elements such as wind turbine blades, heavily loaded structures such as ground logistics vehicles and transportation systems and infrastructure components such as building, roadways and bridges. These structures often contain highly loaded composite laminates that utilize both uni-axial and multiaxial materials including uni-directional fibers (glass, carbon, aramid or other highly aligned synthetic filament stabilized in a cured organic polymer, ceramic or metal matrix). The long term strength of these laminates (under static and cyclic loading conditions) depends on the quality of the alignment of the axial filaments.

However, deformations (e.g. wrinkles, warping, etc.) often form during the curing process which compromises the structural integrity of the part and jeopardizes the component's performance. Furthermore, conventional composite fabrication processes often limit the stiffness, strength and fatigue life of structural blade components, such as I-beams, spar caps, and shear webs, to less than ideal or maximum levels. Similarly, the use of tackifiers alone have proven to be nearly ineffective in preventing wrinkle, while the use of higher concentrations of reinforcing materials create laminate performance concerns. Also, "fiberglass screens" have been used as stabilizing materials but they do so with increased net weight and decreased laminate performance, and they do not have a planar construction.

Some of the disadvantages of the prior methods or devices include:
  Expensive capital equipment for assembly of the material (bonding of rods to non-woven veil).
  Spacing of gaps between rods on the finished product is difficult/impossible to control—which negatively affects the shear deformation. Material lifts from the mold when the material must shear to conform to mold and rods bind by colliding due to shear deformation.
  Industrial processes to control rod tension and subsequent lamination to the non-woven veil results in continuously variable lengthwise alignment of the finished product. Any lateral curvature can significantly reduce the ability of the material to conform to a mold without shear lock-up (rod collision).
  Adhesives used to bind rod to non-woven veil reduce interlaminar shear of infused composite.
  Adhesives used to bind rod to non-woven veil are perishable and result in a six month or less shelf life of product.

There thus remains a need for providing reinforcement materials to enhance strength and stabilization, along with an efficient and economic method and system of manufacturing composite structures, e.g. wind turbine blades.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

In accordance with an aspect of the disclosure, a system for forming a structural element for a composite structure is provided, the composite structure comprising: a composite beam configured to extend along at least a portion of the composite structure; the composite beam including two or more preform layers. Each preform layer including: multiple elongate rods arranged longitudinally and aligned relative to one another in a single layer, each rod being disposed adjacent to and spaced from at least one adjacent rod; each rod including multiple unidirectional, substantially straight collimated structural fibers fixed in a solidified matrix resin so that each rod is rigid and defines a finished geometry; a coupling, the coupling connecting a first rod to an adjacent rod; each preform layer being stacked with one or more other preform layers; and wherein multiple stacked preform layers define a transverse width and a thickness of the composite beam.

In some embodiments the coupling is an adhesive-free coupling, e.g. a mechanical union. The coupling can extend along the entire length of the first rod, or select portions thereof.

In some embodiments the coupling includes a plurality of cells distributed along the length of the rods. The cells can include sidewalls that are aligned in parallel with the rods, wherein the cells include a pair of cross beams traverse to the sidewalls, and a first cross beam extends over the top of the rod, and a second cross beam extends under the rods. In some embodiments all segments of the cells engage the rods.

In some embodiments at least one rod is slideable within the coupling.

In some embodiments the sidewalls have a greater length than the cross beams, and the cross beams have a greater thickness than the sidewalls.

In some embodiments a rod is made from one or more of: glass fabrics, meshes, fibers, yarns and/or rovings; carbon fabrics, meshes, fibers, yarns and/or rovings; graphite fabrics, meshes, fibers, yarns and/or rovings; basalt fabrics, meshes, fibers, yarns and/or rovings; and ceramic fabrics, meshes, fibers, yarns and/or rovings.

In some embodiments adjacent rods are in contact along the entire length of each rod, or only at select locations thereof.

In some embodiments adjacent rods are spaced apart along the length of each rod.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 3-3A are an exemplary embodiment of a knitted warp uni-directional fiberglass product, in accordance with the disclosed subject matter.

DETAILED DESCRIPTION OF AN EXEMPLARY EMBODIMENT

Figure 1:
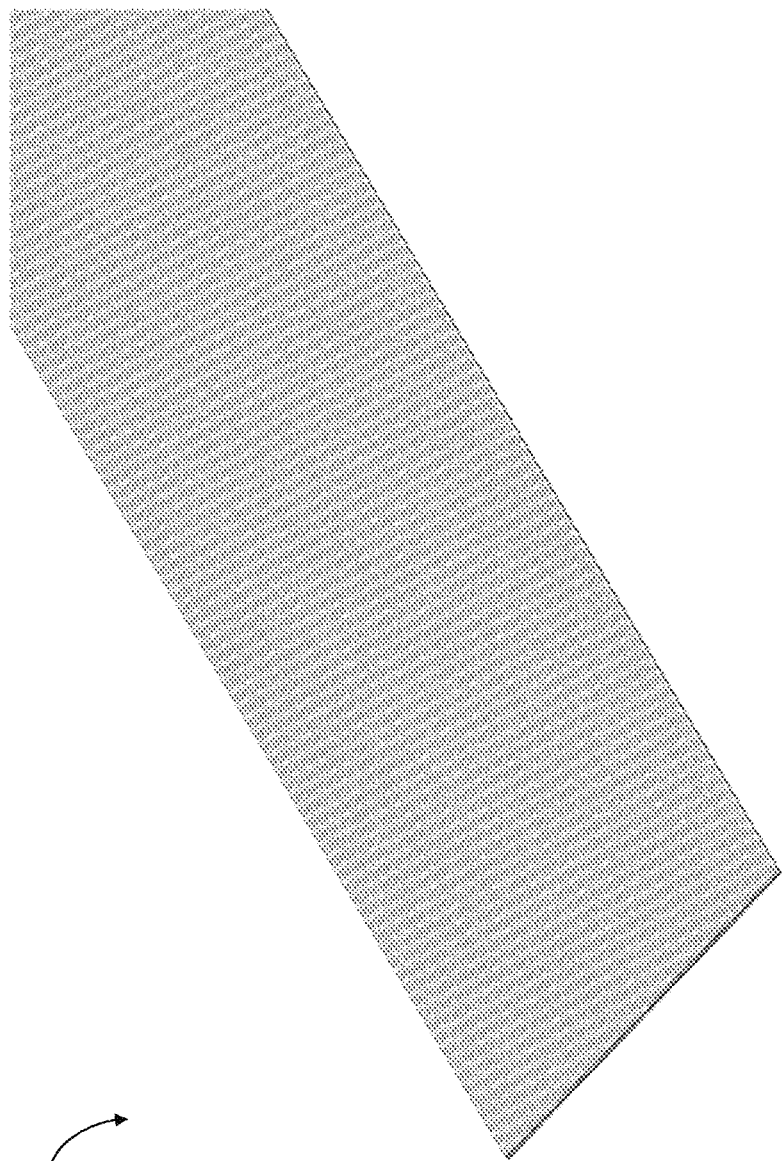
FIG. 1 is a schematic representation of an exemplary embodiment of composite rods for stabilization of composite laminates, coupled to an underlying sheet.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The present disclosure relates to manufacturing processes including the use of high volume (i.e. fraction of fiber to resin content; e.g. typically >65%), precured fiber reinforced polymer support elements (or "rods") that are assembled by bonding the rods to a lightweight non-woven broad good. The resulting material can be assembled to create a constant width, and serve as a layer that can be rolled up at any arbitrary length and dispensed to a desired shape and length. Multiple layers can be stacked together and infused with resin to create a high strength beam. By varying the length of each layer a tapered beam can be laminated that is appropriate as, e.g., a spar cap for a modern wind turbine blade design. An exemplary construction of such a rod and support layer can be found in U.S. Pat. No. 8,540,491, the entire contents of which are hereby incorporated by reference.

The assembly process includes the columniation and subsequent attachment of a large (predetermined) number of precured rod elements to a light-weight non-woven (e.g. polyester) veil. This process creates a material form where the precured rods are bound to a non-woven layer. The material is designed to have a pre-determined space/gap between each rod, but conventional methods make it very difficult to maintain that space in manufacturing. The amount of shear deformation that can take place to accommodate curvature, twist, and lateral displacement to conform to a mold for infusion is limited to the spacing/gap available between rods. In practice, adhering the rods to the polyester non-woven with uniform tension and a uniform gap is not possible using conventional techniques. Consequently, the result is a tremendous limit in shear deformation so that general design of spar caps is not possible, and scrap rates to meet tight specifications for the material drives costs to an unacceptable level.

Additionally, conventional techniques employing adhesives to adhere the rods to the polyester veil are selected from a class of rubber based adhesives that reduce interlaminar shear properties of the resulting composite material created from the infusion epoxy resins in the spar cap molding process. The adhesives are also perishable with a shelf life of less than six months after which time the rods lose their adhesion to the non-woven veil and the material becomes unusable.

The present disclosure solves these fundamental challenges with assembly into a spoolable axially reinforced layer of rods. In accordance with an aspect of the disclosure, the rods are captured in a knitted architecture of lightweight textile yarns (e.g. polyester, glass, aramid, carbon, etc.) with the rods constrained and held in a layer form under a very precise knit, effectively locking each rod in alignment. The knit surrounds the rod, but is not adhered to the rod—thus the rod can slide in relationship to the adjacent rod allowing for much greater shear deformation in comparison to conventional products.

In accordance with an aspect of the present disclosure, a system and technique to utilize pre-manufactured composites rods (or other prismatic linear shapes including hexagonal, elliptical, circular, etc.) is provided in which filaments stabilized in a fully cured organic polymer matrix that contain highly aligned continuous uni-axial fibers are assembled into a planar arrangement to form a sheet of material. The spacing or gap between adjacent rods can be maintained within a predetermined range, e.g., less than 200 microns and/or an angle of less than approximately 2 degrees. The assembly of rods 200 can be formed with any desired width and length.

Figure 2:
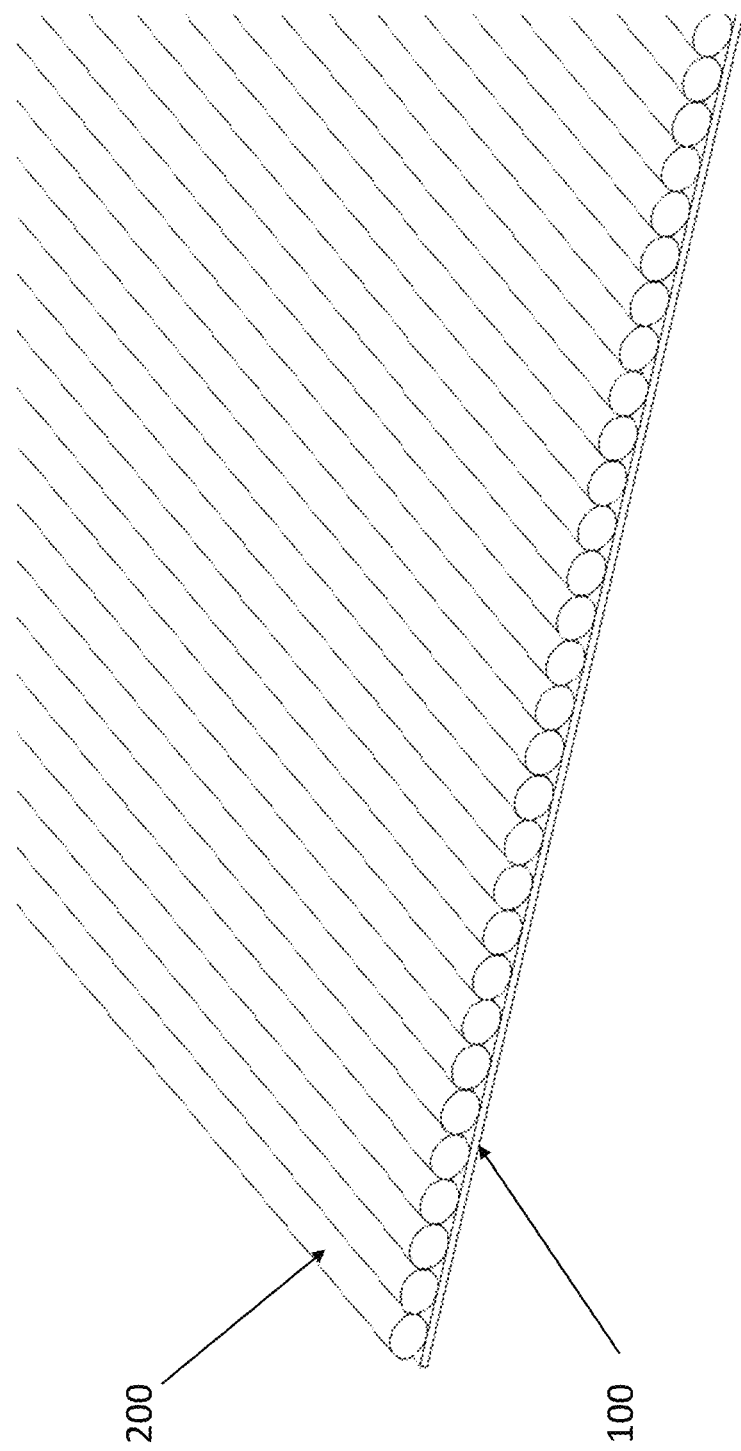
FIG. 2 is a zoom-in view of the exemplary embodiment shown in FIG. 1.
Figure 4:
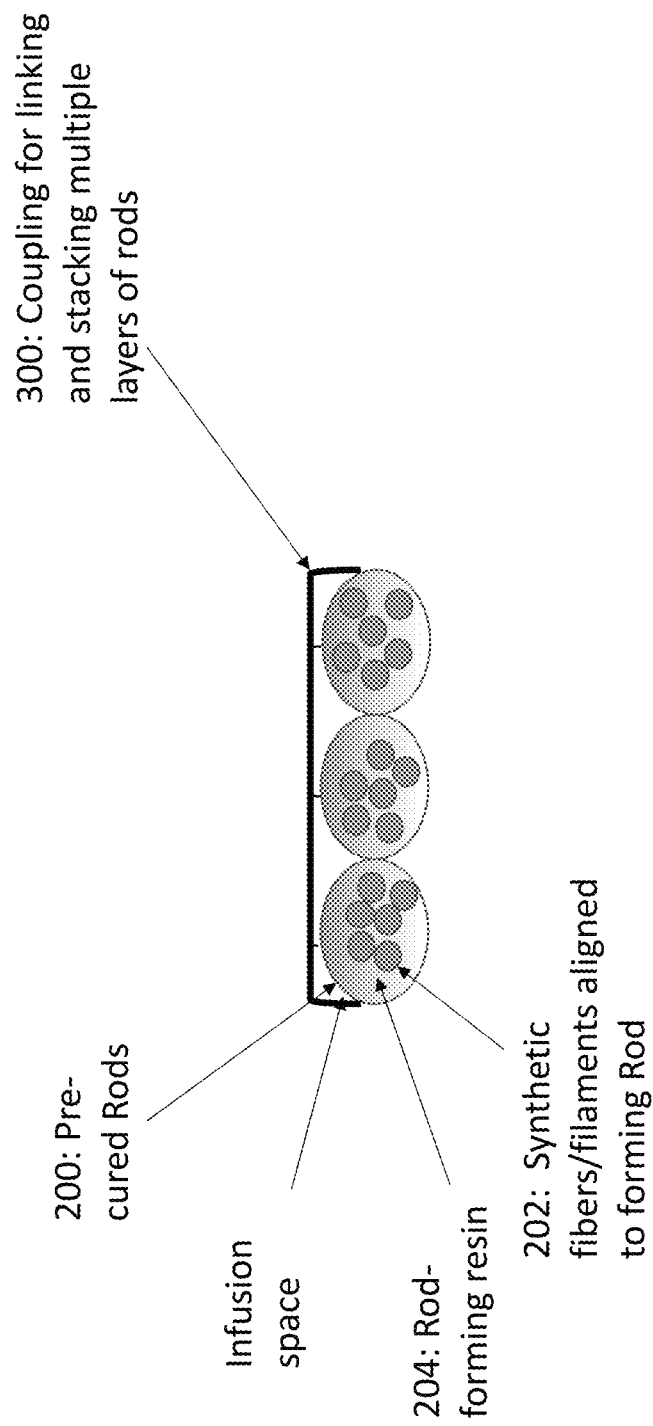
FIG. 4 is a cross-sectional view of an exemplary embodiment of pre-cured rods knitted into a precursor fabric that can be stacked and infused to create a finished structural component, in accordance with the disclosed subject matter.

FIGS. 1-2, depict rods 200 which are assembled onto a carrier sheet 100 via mechanical coupling 300. In accordance with an aspect of the present disclosure, and as shown in FIG. 4, the rods 200 (each containing a plurality of aligned fibers/filaments 202 bonded via resin 204) can be joined together (e.g. woven or otherwise knitted) with fabric 300 and stacked together to form a structure of a desired thickness. This assembly can be formed without the need for a carrier sheet. Without the carrier sheet present, the stacked assembly of coupled rods can remain exposed to facilitate permeation and permit flow of liquid bonding resin between stacked preform layers and individual rods 200.

The rods 200 can be coupled together with a flexible fabric 300, e.g., a denier knitted polyester thread or other material such as acrylic, nylon, or aramid. Also, the rods 200 are loosely coupled together such that each rod is capable of relative movement (e.g. axial displacement) with respect to an adjacent rod(s).

In some embodiments the rods 200 can be configured with a planar construction—i.e. the rods 200 have a uniform diameter/height. The rods can have a uniform construction (e.g. diameter, length) thus in conjunction with the tightly controlled spacing provided by mechanical coupling 300, the space/gap between rods in the assembled preform product is constant.

In some embodiments, the rods 200 can be positioned in abutting fashion with each rod contacting the adjacent rods. Irrespective of the particular placement of rods 200 employed, the relative spacing or gap between rods is uniform and maintained throughout any manipulation of the preformed structure. Similarly, the orientation of the rods (i.e. the uni-directional configuration) is uniform and maintained throughout any manipulation of the preformed structure. Once joined to adjacent rods, unintentional removal of a single rod is precluded.

The rods 200 are assembled, aligned and coupled to each other via mechanical couplings 300, e.g. knitting. The knitting can include a plurality of "cells" distributed along the length of the rods 200. As shown in FIG. 3A, each cell can include sidewalls 302a, 302b that are aligned with the rods to extend along the same direction. A plurality of cross beams 304a, 304b, 304c can traverse between the sidewalls, e.g. at 90 degree angles as shown. The cell coupling technique disclosed herein is superior to alternative (e.g. zig-zag weave pattern) techniques in that it provides a stable union between the components, and does not unravel upon being cut (as is the case with a weave technique).

Figure 3:
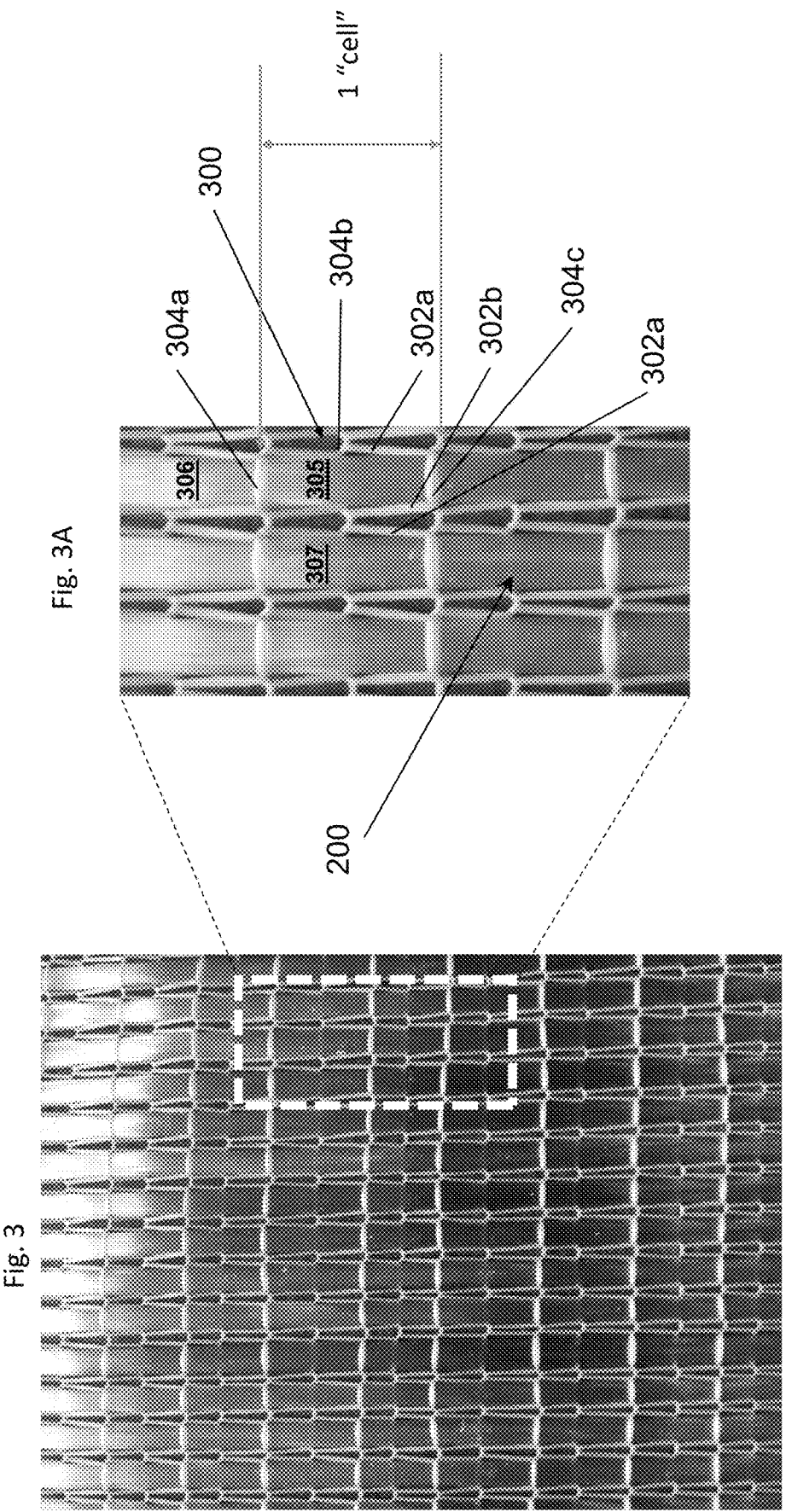

A cell can include a first (or top) cross beam 304a, a second (or middle) cross beam 304b, and a third (or bottom) cross beam 304c; and a pair of sidewalls 302. The sidewalls 302 are joined to the cross beams 304 via a mechanical coupling, e.g. knitting. These coupling locations can be free of adhesive. In the embodiment shown in FIGS. 3-3A, a gap or space can be provided between sidewalls 302 of adjacent cells. In contrast, the cross beams 304 can be configured such that there is no gap or space between cross beams 304 of (vertically) adjacent cells. In other words, vertically adjacent cells can share a common cross beam such that cross beam 304a of FIG. 3A is the top cross beam for cell 305, as well as the bottom cross beam of cell 306.

Adjacent sidewalls 302a, 302b defining an individual cell can be oriented in a common (e.g. generally parallel) manner, and maintain that orientation such that the sidewalls remain aligned throughout any deformation to the final assembled product. Similarly, adjacent cross beams 304a, 304b, 304c defining an individual cell can be oriented in a common (e.g. generally parallel) manner, and maintain that orientation such that the cross beams remain aligned throughout any deformation to the final assembled product. Additionally, the sidewalls 302 of adjacent cells can remain aligned such that a sidewall 302, which extends along multiple cells, remains linear and free of distortion or displacement throughout any deformation to the final assembled product. Likewise, the cross beams 304 of adjacent cells can remain aligned such that a cross beam 304, which extends across multiple cells, can remain linear and free of distortion or displacement throughout any deformation to the final assembled product.

In some embodiments, the sidewalls 302 of laterally adjacent cells can converge towards each other. For example, as shown in FIG. 3A, sidewalls 302b of cell 305 can extend from cross beam 304b in such a manner as to converge with the corresponding sidewall 302a of adjacent cell 307. This can result in generally trapezoidal shaped gaps or spaces between laterally adjacent cells (305, 307) thereby spacing individual strength elements or rods 200. The cell structure forms a relatively loose union of rods 200 as described herein. These spaces between the adjacent cells help to enhance the bend and twist/sweep abilities of the rods 200 and also facilitates penetration of the bonding resin between individual rods 200, as well as between stacked or layered preform layers (in those embodiments in which the final product includes multiple layers).

The first cross beam 304a can extend over the top of the rod 200, while the second cross beam 304b can extend under the rod 200, and the third cross beam 304c can extend over the top of rod 200. Thus, the cross beams 304 can alternate in their position relative to the rod 200 such that each adjacent cross beam is positioned in a different or alternate position (e.g. either above, or below) with respect to rod 200. Thus, in contrast to a weave pattern, the cell coupling structure disclosed herein does not require that the mechanical coupling 300 undulate or oscillate above and/or below the rods 200. Instead the mechanical couplings remain in a single plane, and positioned in a fixed relationship relative to the rods 200 (e.g. cross beam 304b remains below the rod 200, while cross beams 304a, 304c remain above the rod 200)—all while allowing each rod to move, e.g. slide longitudinally, within the cell.

All segments of the mechanical couplings 302a, 302b and 304a, 304b, 340c can engage the rod, while allowing sufficient freedom to permit the rod to slide within the coupling. In some embodiments the mechanical coupling members are formed with homogenous construction. In other embodiments the cells can be formed with a non-homogenous construction, e.g., sidewalls 302 can have a greater length than the cross beams 304; and the cross beams 304 can be formed with a greater thickness than the sidewalls 302.

Joining the rods 200 via the knitting 300 is advantageous in that, unlike stitching to an underlying carrier sheet, the edge (e.g. sides) of the part is completely encircled and captured by the knit member 300, thereby preventing the rod 200 from dropping out due to unravelling of the edge stitches.

Additionally, the preform layer disclosed herein can include designations that indicate the cell boundaries or position(s) at which the preform can be separated, e.g., cut, from another adjacent preform layer where the preform is provided in a continuous web. Such designations can also facilitate positioning of the preform layers in the stacked formation during assembly of the stacked formation.

The present disclosure provides pre-cured rods (e.g. synthetic fibers of glass, carbon, etc. and polymer resin combined to create a rigid highly-aligned composite element) knitted into a finite width and arbitrary length precursor that can be stacked and infused to create a finished structural component. This finished structural component exhibits a high axial stiffness with nearly perfect fiber alignment and free of fiber distortion, waves or wrinkles. Additionally, the finished structural component can be infused with polymer resin and cured quickly because there only a small amount of uncured resin bonding the stack of aligned rods together. The small volume of resin creates a small exotherm which prevents thermal distortion, matrix cracking, etc. This improves cycle time and drastically improves production capacity.

In accordance with an aspect of the present disclosure, the rod assembly can be integrated as a component in a dry preform layup as part of the "SCRIMP" process (as disclosed in U.S. Pat. No. 4,902,215, the entire contents of which are hereby incorporated by reference). In such a setting, the rods 200 provide a porous medium for resin to flow through, or around, and also provide stability to the preform to mitigate any tendency for the preform to wrinkle or deform. Additionally, these materials can be used judiciously in thick stacks (interspersed to minimize cost but optimize effectiveness of laminate stability). In some embodiments, the rod 200 assembly can be employed in load bearing sections of a blade, e.g., in spar caps or in the root section of blades where the use of the present disclosure reduces or eliminates scrap as a result of wrinkle formation in spar caps and allows for more rapid heating and curing of spar caps.

Tension control of the mechanical coupling 300 (e.g. knitting yarns) can be monitored and adjusted to maintain uniform tension of the warp rods 200 being knitted. Because no adhesives are used in the construction, the material is not perishable and the shelf-life of the spooled material is infinite. In some embodiments the coupling 300 can be a continuous member extending between adjacent cells. Thus a force, e.g. tension, applied at one end of the coupling 300 can be distributed throughout all cells that are formed by a portion of that particular coupling. Accordingly, the present disclosure provides a reliable industrial process that can be employed to fabricate the assembled reinforcement material with near-zero scrap/rejection rates and material form that can be used in more generalized spar cap design for wind turbine blades.

Exemplary Embodiment: Spar Cap

One exemplary application for the disclosed subject matter is a setting where the materials can be placed or interleaved as components into an infused unidirectional spar cap. In this embodiment, predominantly uni-directional non-crimp fabrics (e.g. the percentage of axially aligned fiber is greater than 88%) are laid into a mold and infused with a stabilizing matrix (e.g. a polymer of either thermosetting or thermoplastic resin). Typically the resulting structure, or spar cap, is composed of a plurality of plies (often more than 60 individual plies) and infused with epoxy resin. The preform structure referred to herein can be applied by "interleafing" the structure (i.e. sheet 100, rods 200, coupling 300) between a pre-determined number of conventional non-crimp fabrics. The edges of each plie can overlap or be offset relative to an upper/lower plie; alternatively, the edges of each plie can be aligned vertically. The number of plies can be adjusted to form a variety composite products having differing sizes, shapes and/or weight, and is determined based on cost and performance requirements of the assembled product. The result is a structural component that is stable, deformation resistant, and provides rapid processing and curing. An additional benefit of the present disclosure is that this technique eliminates any risk of non-planer fiber waves or wrinkles being formed in the product, which could result in significant reduction in operating strength.

Exemplary Embodiment: Interleaved Layer Between Skin Components

In another exemplary embodiment, the preformed structure can be interleaved in skin components of the wind turbine blade, particularly in the region of the blade nearest to the root, spanwise through the transition of the cylindrical root to the maximum chord width of the blade. The skin thickness in this region is larger (compared to the tip section) and coupled with the compound curvature of surfaces in this region often results in non-planer waves or wrinkles in these highly loaded areas of the blade. In this embodiment, plies of the preformed structure can be applied at a variety of predetermined rotated angles (relative to a fixed axis, e.g. the spanwise oriented pitch axis). While the edges of each plie of non-crimp fabric are typically aligned and arranged in a linear fashion, an advantage of the present disclosure is that the "shearability" of plies provides some flexibility to allow for a non-linear contour. The orientation is determined along a rotated axis that will minimize out of plane forces but provide stability to laminate and prevent formation of localized non-planar waves and wrinkles. This improves both the relative strength of the blade and eliminates the risk of part-to-part variation resulting from the formation of laminate defects. Incorporating the preformed structure in this embodiment is relative to the size and/or thickness of the prismatic beams that make up the individual stiffening rods 200. For example, thinner (relative to z-direction of ply) rods would be used in this exemplary embodiment.

Accordingly, by capturing, through the advanced knitting process disclosed herein, a multiplicity of aligned precured uni-directional fiber reinforced polymer elements, a material layer can be effectively created that is stable, (alignment preserved), transversely porous (i.e. allows flow of binding resins through the thickness of a stack of such layers), and is able to shear through slip of the unidirectional material through the knitting yarns to conform to complex surfaces that include twist and shear.

Manufacturing of composite products using equipment developed for UD (uni-directional) fiberglass textiles can be modified and improved to accept the precured elements disclosed herein as "warp" ends in the process for high speed, low risk manufacturing. This minimizes the cost of conversion compared to current solutions that are slow, result in a high percentage of scrap materials, and does not create the flexible material system necessary to conform to the most generalized shape of spars desired to optimize blade performance.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A structural element for a composite structure comprising:

a composite beam configured to extend along at least a portion of the composite structure;

the composite beam including two or more preform layers, each preform layer including:

multiple elongate rods arranged longitudinally and aligned relative to one another in a single layer, each rod being disposed adjacent to and spaced from at least one adjacent rod;

each rod including multiple unidirectional, substantially straight collimated structural fibers fixed in a solidified matrix resin so that each rod is rigid and defines a finished geometry;

a coupling, the coupling connecting at least a first rod to an adjacent rod, the coupling configured as a cell structure having a plurality of beams, wherein:

the plurality of beams remain in a single plane, and the plurality of beams positioned in a fixed relationship relative to the rods, each preform layer being stacked with one or more other preform layers; and wherein multiple stacked preform layers define a transverse width and a thickness of the composite beam; and wherein an edge of the structural element is completely encircled by a knit member.

2. The structural element of claim 1, wherein at least one rod is free to move with respect to the coupling cell structure.

3. The structural element of claim 2, wherein the movement includes sliding longitudinally with respect to the coupling cell.

4. The structural element of claim 1, wherein at least one beam of the coupling is disposed above the rod.

5. The structural element of claim 1, wherein at least one beam of the coupling is disposed below the rod.

6. The structural element of claim 1, wherein at least one rod is captured in a knitted architecture of lightweight textile yarns.

7. The structural element of claim 6, wherein the lightweight textile yarns comprises polyester.

8. The structural element of claim 6, wherein the lightweight textile yearns comprises aramid.

9. The structural element of claim 6, wherein the lightweight textile yarns comprises carbon.

10. The structural element of claim 1, wherein the plurality of beams are disposed transverse to the cell structure.

11. A structural element for a composite structure comprising:

a composite beam configured to extend along at least a portion of the composite structure;

the composite beam including two or more preform layers, each preform layer including:

multiple elongate rods arranged longitudinally and aligned relative to one another in a single layer, each rod being disposed adjacent to and spaced from at least one adjacent rod;

each rod including multiple unidirectional, substantially straight collimated structural fibers fixed in a solidified matrix resin so that each rod is rigid and defines a finished geometry;

a coupling, the coupling connecting at least a first rod to an adjacent rod, the coupling configured as a cell structure having a plurality of beams, wherein:

the plurality of beams remain in a single plane, and the plurality of beams positioned in a fixed relationship relative to the rods, each preform layer being stacked with one or more other preform layers; and wherein multiple stacked preform layers define a transverse width and a thickness of the composite beam, wherein the at least one rod is spaced from an adjacent rod at an angle of less than 2 degrees.

12. A structural element for a composite structure comprising:

a composite beam configured to extend along at least a portion of the composite structure;

the composite beam including two or more preform layers, each preform layer including:

multiple elongate rods arranged longitudinally and aligned relative to one another in a single layer, each rod being disposed adjacent to and abutting at least one adjacent rod;

each rod including multiple unidirectional, substantially straight collimated structural fibers fixed in a solidified matrix resin so that each rod is rigid and defines a finished geometry;

a coupling, the coupling connecting at least a first rod to an adjacent rod, the coupling configured as a cell structure having a plurality of beams, wherein:

the plurality of beams remain in a single plane, and the plurality of beams positioned in a fixed relationship relative to the rods, each preform layer being stacked with one or more other preform layers; and wherein multiple stacked preform layers define a transverse width and a thickness of the composite beam, wherein the multiple stacked preform layers are configured to allow liquid bonding resin between the stacked preform layers and the rods; and wherein the plurality of beams are coupled to the cell structure at at least one coupling location via a knitting coupling.

13. The structural element of claim 12, wherein the plurality of beams are disposed transverse to the cell structure.

14. The structural element of claim 12, wherein an edge of the structural element is completely encircled by a knit member.

15. The structural element of claim 12, wherein the cell structure is spaced from an adjacent cell structure to form gap there between.

16. The structural element of claim 12, wherein the cell structure is configured to abut an adjacent cell structure.

17. The structural element of claim 12, wherein the cell structure and an adjacent cell structure each share a common cross beam.

18. The structural element of claim 17, wherein the common cross beam is a top cross beam relative to the cell structure and a bottom cross beam relative to the adjacent cell structure.

* * * * *